Aug. 24, 1954

A. B. PICKETT 2,687,016

REVETMENT LAYING APPARATUS

Original Filed July 24, 1947

Inventor
Andrew B. Pickett
By *Clarence A. O'Brien*
and *Harvey B. Jackson*
Attorneys Inventor
Andrew B. Pickett
By [signatures]
Attorneys

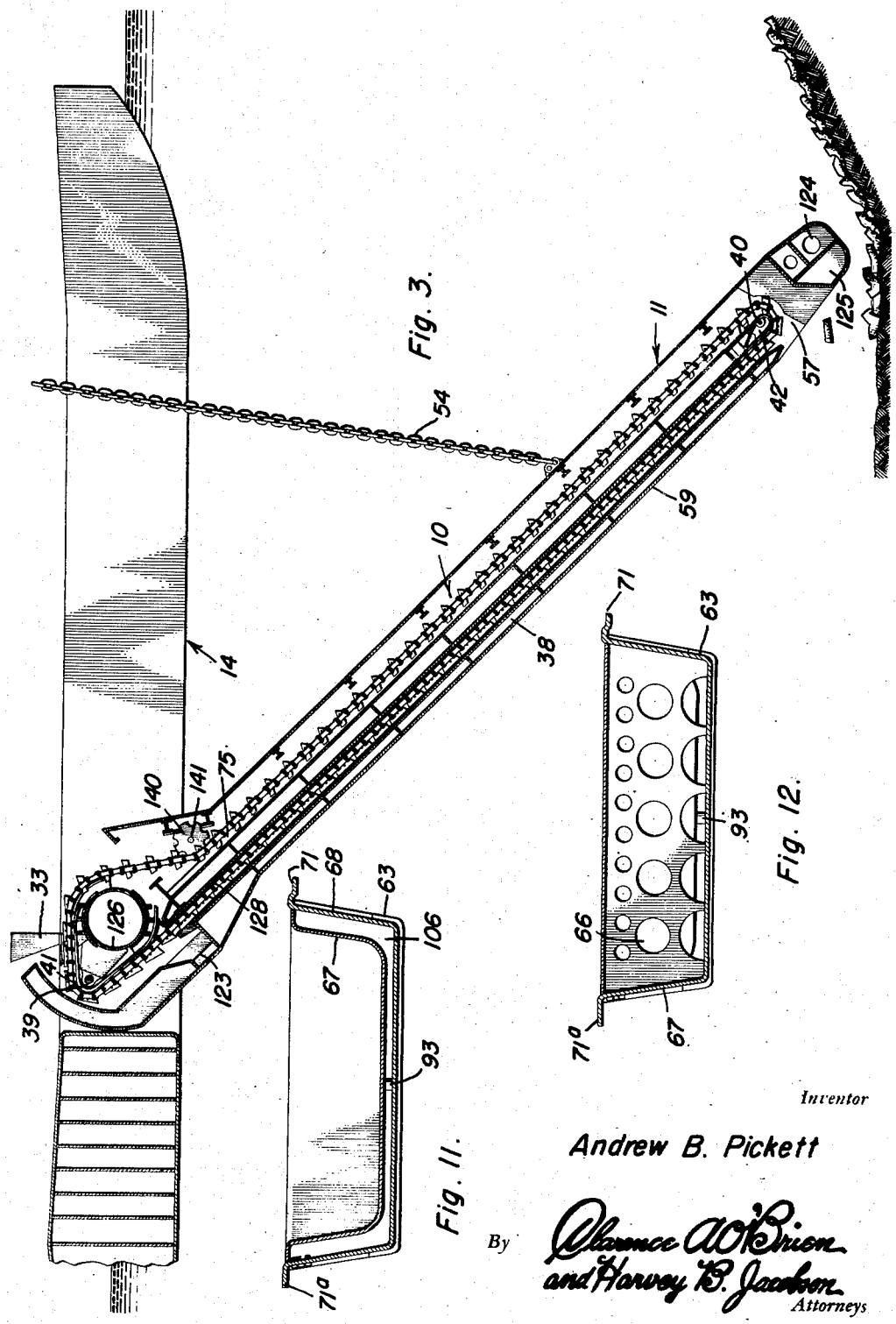

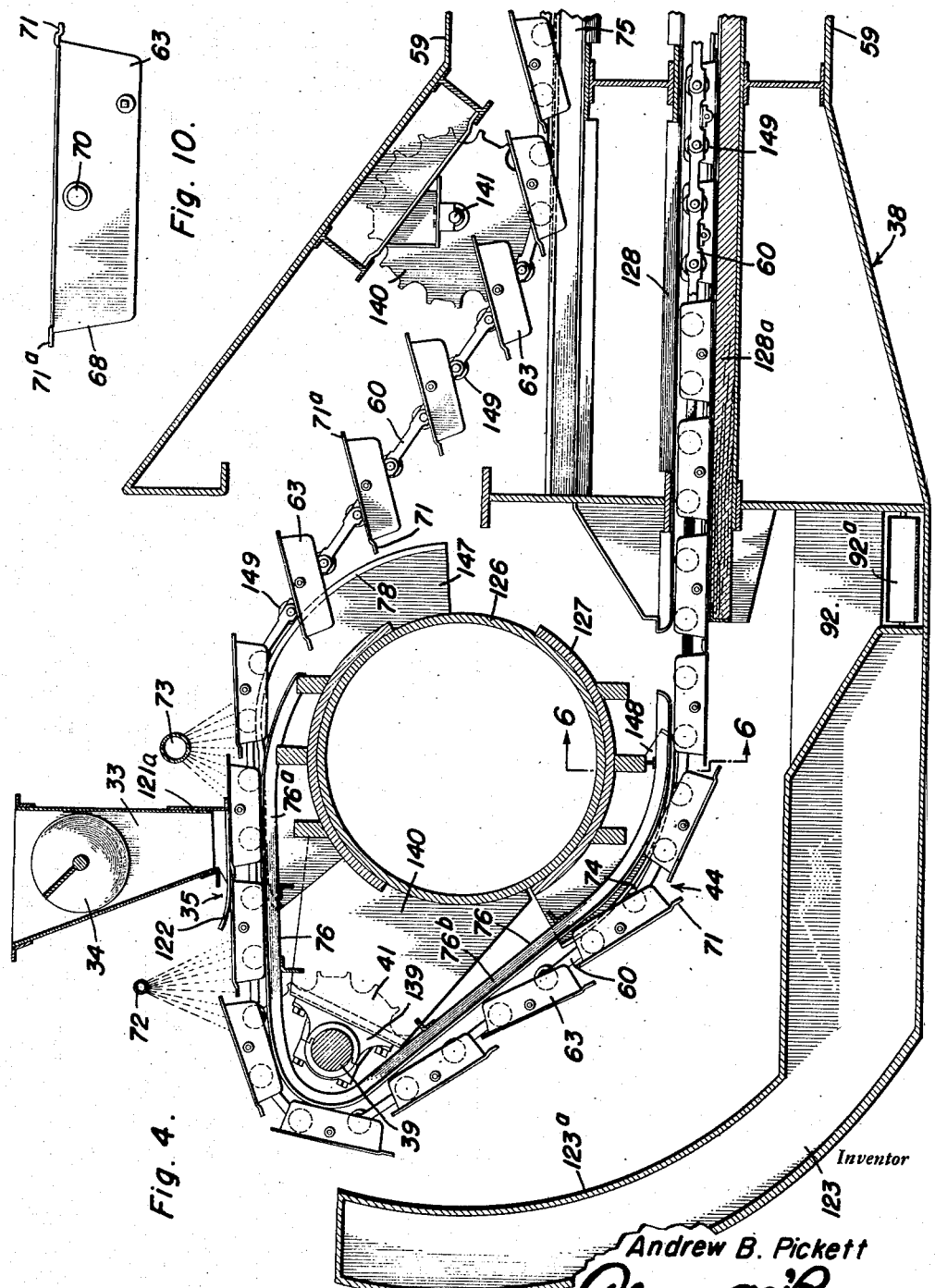

Aug. 24, 1954     A. B. PICKETT     2,687,016
REVETMENT LAYING APPARATUS
Original Filed July 24, 1947     6 Sheets-Sheet 5
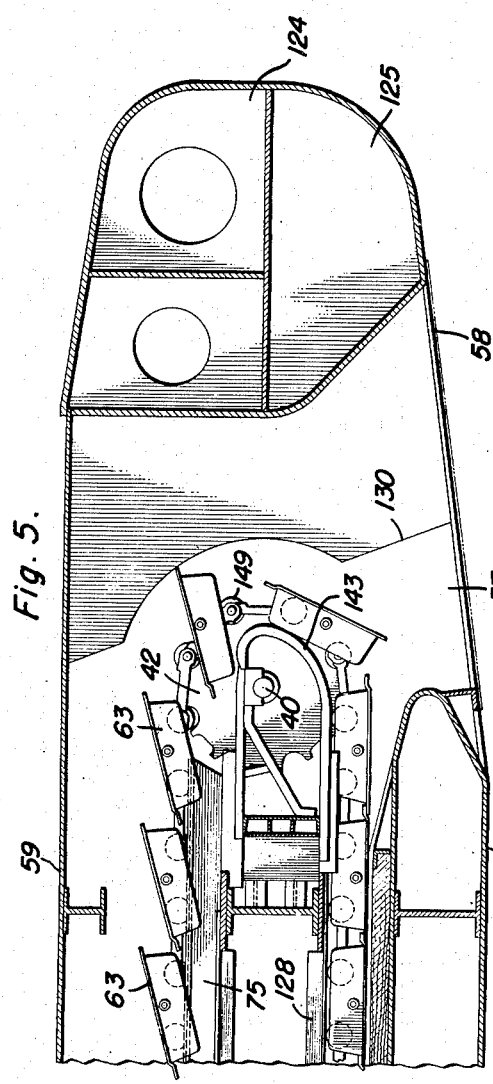
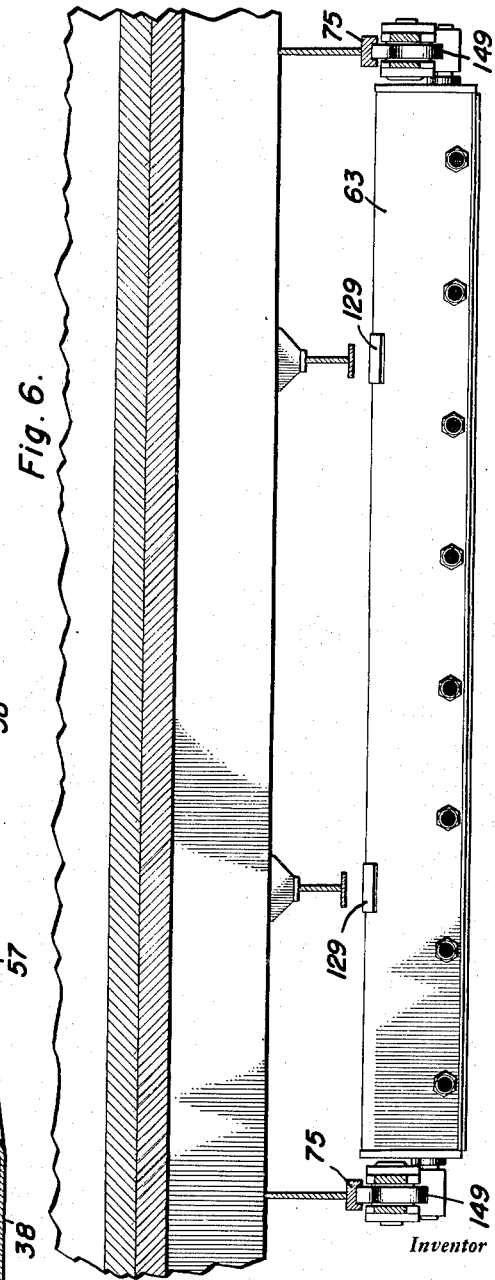
Inventor
Andrew B. Pickett
By
Attorneys

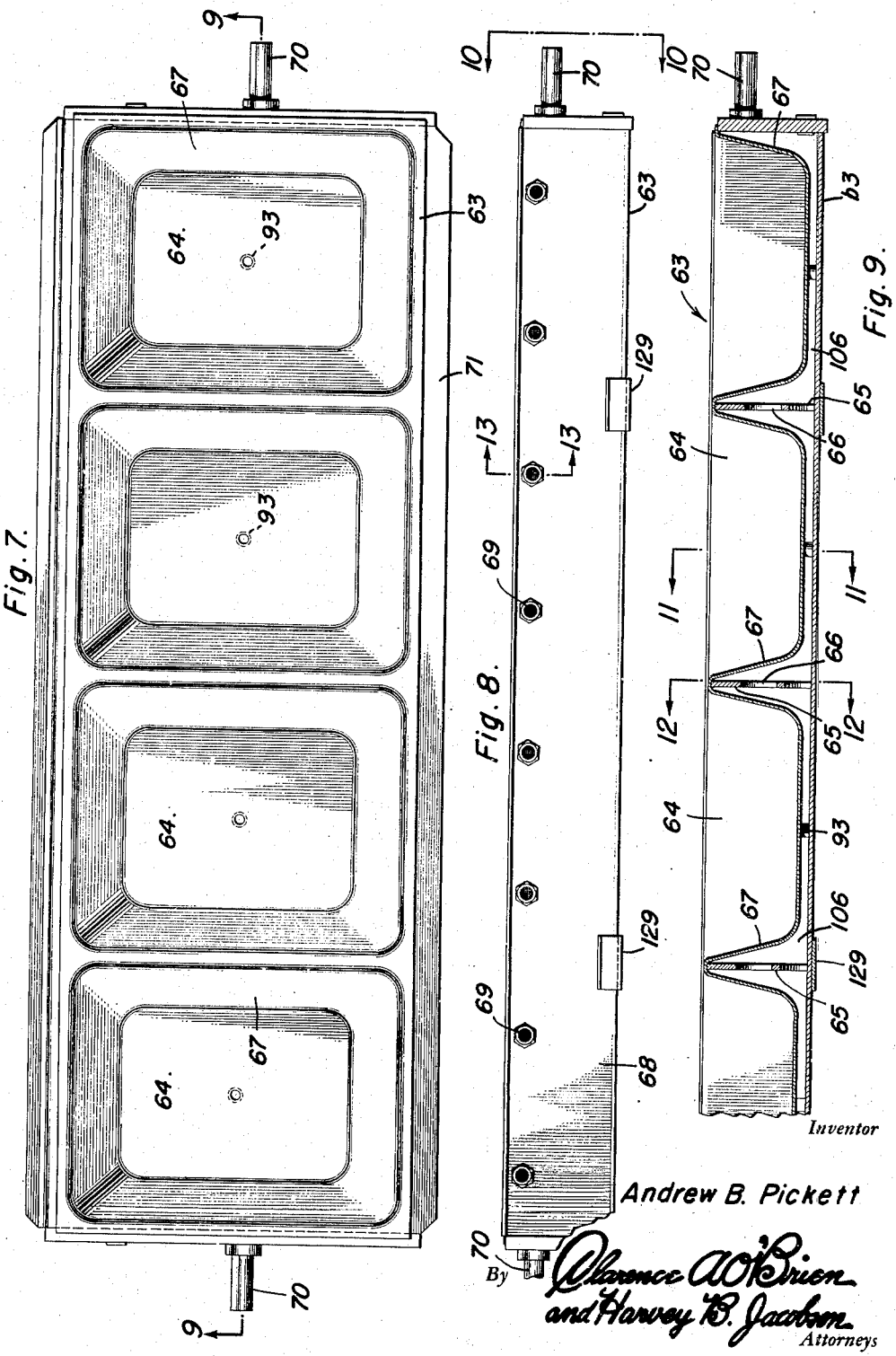

Patented Aug. 24, 1954

2,687,016

UNITED STATES PATENT OFFICE 2,687,016

REVETMENT LAYING APPARATUS

Andrew B. Pickett, New Orleans, La.

Original application July 24, 1947, Serial No. 763,202. Divided and this application June 20, 1949, Serial No. 100,132

15 Claims. (Cl. 61—37)

This application is a divisional application and a continuation-in-part of my prior co-pending application Serial No. 763,202 for which Patent No. 2,476,682 has been granted.

This invention relates to embankment and river bed protection and it has for its object to provide means for producing and laying revetments or other protective layers for protecting and/or constructing dams, dikes, levees, ditches, embankments and similar structures or for repairing the same.

In the above identified earlier application a method is described which essentially consists in forming a substantially cohesive, but flexible protective mat or mattress from independent and separate elements or blocks which are separately manufactured and afterwards brought into a state of adhesion.

The primary object of the present invention consists in providing an installation and apparatus for carrying the above characterized method into effect.

Accordingly it is an object of the present invention to provide a floating installation with apparatus for currently producing the above mentioned elements or blocks, for conveying said blocks or elements from the place at which they are produced directly to the place where the revetment or other embankment protection is to be laid and for dumping them onto the embankment or into the river bed or on the other surface to be protected in such a manner and under such conditions that a cohesive mat or mattress is formed, the formation of a mattress or mat being due to an installation, including means for simultaneously moving said production, dumping and transportation means at a predetermined speed over the surface to be covered by the protective layer or revetment.

Another object of the invention consists in providing means for continuously producing the elements of the flexible mat forming the revetment, on a conveyor under temperature conditions securing a temperature of the elements at the place to which they have been conveyed which is sufficiently high to produce an adhesion of the elements.

A further object of the invention consists in providing means for continuously and simultaneously producing a number of the said elements at a relatively high temperature at which parts of these elements are in a viscous semi-fluid or fluid state in conveying these elements continuously to the place where they form the revetment and in cooling them between these operations to an extent which is sufficient to secure the retaining of their shape while at the same time the temperature is still sufficiently high to obtain adhesion between the elements a sufficient extent of plasticity of the same.

A further object of the invention consists in providing an installation producing elements which are hardened at the surface but which retain a hot core, forming a source of heat which is active for some time and which secures plasticity at the time of forming the mattress.

A further object of the invention consists in providing means for the continuous simultaneous production and for the continuous laying of a number of such separate elements forming a cohesive flexible mattress, said means including a movable barge with a continuous conveyor, one end of which cooperates with means for producing the elements, while the other end of the conveyor is provided with means for discharging said elements.

A further object of the invention consists in providing an installation, including a conveyor, on which the said elements may be produced from a hot fluid or semi-fluid mixture, means being provided on the conveyor for cooling the outer surface of said elements directly by the action of water which is carried by the said conveyor.

A still further object of the invention consists in making the conveyor movable along the revetment laid and in providing means for regulating the speed at which the conveyor is moved.

Further objects of the invention will be apparent from the following detailed specification.

The invention is illustrated in the accompanying drawings in which the installation used in a specific case is shown schematically by way of example. It is however to be understood that the specific example shown is illustrative and serves the purpose of explaining the principle of the invention and the best mode of carrying the principle into effect. The example shown is therefore not to be regarded as limitative with respect to the nature of the means employed or as exhaustive as regards to possible modifications of the invention. Modifications of the example shown are therefore not necessarily departures from the essence of the invention.

In the drawings:

Figure 3 is a diagrammatic elevational side view of a part of the installation, partly in section and showing the plant in working position.

Figure 4 is a diagrammatic elevational view of the upper portion of the conveyor and beam illustrating the filling portion of the pans, partly in section.

Figure 5 is a similar diagrammatic elevational view of the lower or tail end of the conveyor illustrating the dumping and depositing operation, partly in section.

Figure 6 is a partly sectional and elevational view through the lower section of the conveyor, the section being taken along the line 6—6 of Figure 4.

Figure 7 is a plan view of one of the pans of the conveyor.

Figure 8 is an elevational view of one of the pans of the conveyor.

Figure 9 is an elevational sectional view of one of the pans of the conveyor, the section being taken along line 9—9 of Figure 7.

Figure 10 is an elevational side view of one of the pans of the conveyor.

Figure 1:
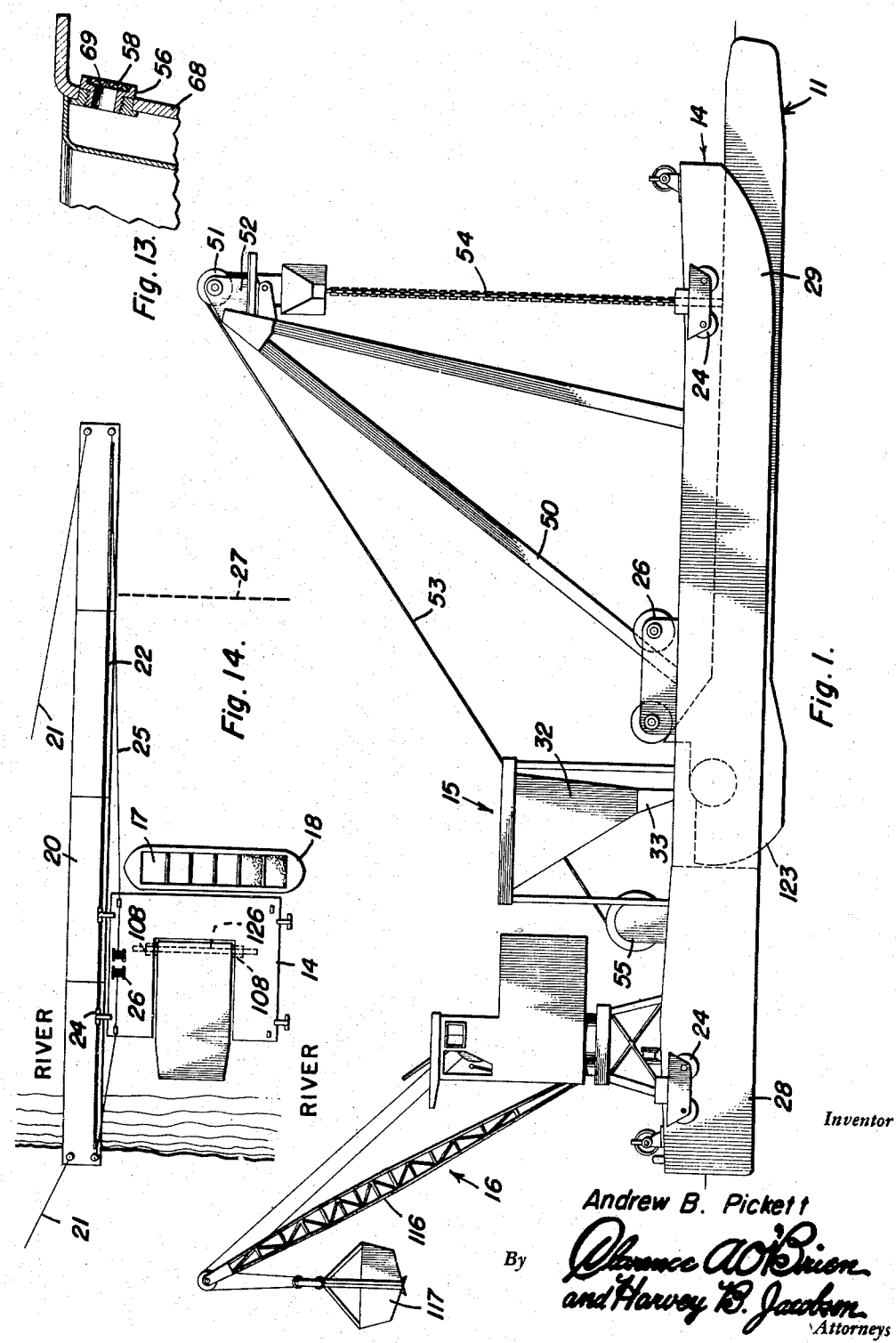
Figure 1 is a diagrammatic elevational side view of the plant for laying revetments with its parts in position for water transportation.

Figures 11 and 12 are sectional elevational views of one of the pans of the conveyor the sections being taken along lines 11—11 and 12—12 of Figure 9 respectively.

Figure 13 is a sectional elevational view of a detail the section being taken along 13—13 of Figure 8.

Figure 14 is a diagrammatic plan view of the plant when in place on the bank of a river.

In the above mentioned earlier co-pending application it has been explained that the method according to the present invention aims at producing a revetment consisting of a more or less continuous layer of elements adhering to each other, formed by separate elements or blocks dumped separately into the river bed or on the embankment in a systematic fashion. The adhesion between the blocks which forms a continuous mattress from said separate elements is produced by the intimate connection between the manufacturing and laying process of the elements. A hot asphalt or bituminous mixture is introduced or poured into cooled pans forming part of the conveyor, immediately before dumping said elements onto the place where the revetment has to be laid in an orderly fashion. The result of this process are blocks or elements of asphalt bonded material formed and molded in the pans which by virtue of the cooling of the pans are almost solid on their surface while still hot in their interior. Preferably the process is so timed that the blocks cool to the required and desired extent by the combined action of the cooling in the pans and the downward travel of the block or element through the water to the river bed during the laying operation.

The blocks, when they have left the conveyor and have been laid on the river bed or embankment are therefore still sufficiently warm to stick to each other so that a continuous mat or mattress is formed and a sufficient amount of plasticity is left on account of the high temperature in the interior of each block or element to bend or to conform said elements to the shape of the base. The hot core will keep the blocks or elements warm for some time and accommodation of the shape to the adjacent elements and to the shape of the river bed or embankment can continue until perfect adjustment is reached.

The above process described more fully in the aforesaid co-pending application may preferably be carried out in such a way that the blocks are produced and formed in double walled pans which are cooled by the introduction of water between the double walls and which form part of a continuously moving conveyor traveling from a place above the surface of the water at which the pans are filled with the asphalt or bituminous mixture through the water to the place of the river bed or embankment at which the blocks are laid. The equipment used for this purpose is diagrammatically illustrated in Figures 1, 3 and 14. The endless conveyor 10 is mounted on a swingable boom 11 described below in detail, which is pivotally mounted on a U-shaped barge 14 carrying a feeding arrangement for the raw materials, generally indicated at 15. To supply the feeding arrangement 15 with raw materials, a number of cranes or derricks 16 are mounted on the barge 14 having jib or feeder arms 116 with buckets 117 which may be dipped into the bins 17 within barge 18 which has been moved alongside the U-shaped barge 14.

The U-shaped barge 14 with the block producing and revetment laying plant is arranged alongside a row of mooring barges 20 anchored opposite the river bank by means of cables 21. The said barges are provided with a track or tracks 22 while the U-shaped barge is provided with outriggers or brackets carrying pulleys 24 running on said tracks. The movement of the barge 14 is preferably obtained by means of a cable 25 running along the row of mooring barges 20 and over the barge 14 where the cable runs over and through a travel winch 26 by means of which the barge 14 may be hauled along said cable. The winch 26 may be driven by an electric motor (not shown). The construction of the mechanism for moving the barge 14 along the mooring barges is not part of this invention and is well known in the art, so that it need not be described or illustrated further.

It will be understood that the revetment laying plant on barge 14 may be moved away from the river bank outwardly to a point 27 indicated in dotted lines, when the end of the boom is above the toe of the revetment. It will also be understood from the foregoing description that the revetment is essentially produced on and by the boom 11 on barge 14 and that when the latter is moved outwardly, a revetment strip of the width of the boom 11 will be produced. When the toe of the revetment has been reached, the row of mooring barges 20 is advanced and a further revetment strip is laid adjacent to the first strip, the entire revetment being thus built up or formed by aligned strips.

From the general description of the process it will be clear that the formation and production of the revetment strips takes place essentially by means of the elements produced on and laid by the U-shaped barge 14. This barge comprises a longitudinal section 28 and two spaced transverse sections 29 between which the boom 11 is inserted. In the longitudinal section 28 means, such as the winch 119 and pulleys 120 are provided to hold the barge 18 alongside the section 28 of barge 14 and to shift it to any desired position.

The derricks 16 are so placed on the barge 14 that their jib arms 116, and buckets 117 may be swung over a number of bins 17 on barge 18. The derricks must have access to all the bins of the barge 18 either directly, or, if necessary, after moving the said barge by means of the cable 121. In the arrangement shown this result is obtained by means of the swinging jib arms. Within reach of these arms the two feeding hoppers 32 of the feeding device 15 are mounted into which the derricks 16 empty their buckets.

The material supplied by the bin barge 18 is a hot mixture of asphalt cement, sand and gravel, of varying proportions, according to the materials used and to requirements of the case. The average composition contains approximately about 24% of aggregate (sand, gravel and the like) and 6% of asphalt cement. The materials used for producing the mixture are dried and heated in the conventional manner and the mixture is then loaded into the bin barge 18, the whole process being approximately the same as that used for repairing roads or the like. The mixture, in addition to sand and gravel may sometimes contain a mineral filler such as powdered loess. The mixture is prepared at a temperature of approximately 300° F. according to the usual practice.

Figure 2:
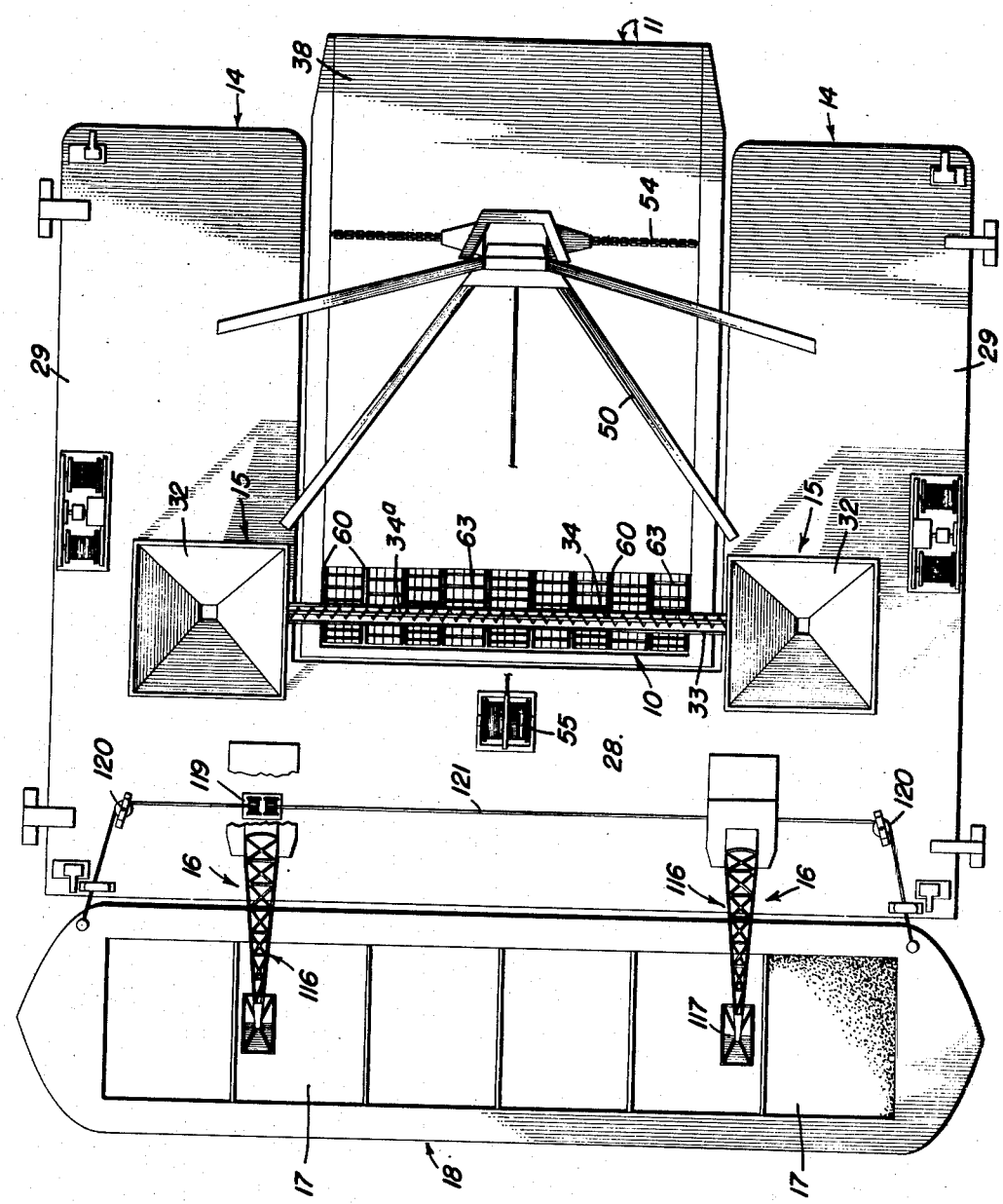
Figure 2 is a diagrammatic plan view of the plant shown in Figure 1.

The feeding arrangement of the boom 11 consists in a number of feeding hoppers 32, two of said hoppers being shown in Figure 2 by way of example. The hoppers discharge the mixture into a feeding or screed box 33. The screed box is an open box of elongated shape which runs across the entire width of the boom 11 and towards the feed hoppers 32 to which it is joined so that the material with which the hoppers 32 are charged falls directly into the screed box. The box may be open at the top and it is open at the bottom along the stretch located above the boom 11. This open side forms the discharge end. The box is provided with side walls converging towards the above mentioned discharge end. It contains distributors 34, 34a in the shape of screw conveyors running along the box from the ends joined to the feed hoppers towards the middle, in order to distribute the hot mixture evenly over the entire length of the box. The screw conveyors are driven by electric motors (not shown).

A movable screeding shoe 35 may be provided, consisting of a vertical member 121a which is slidable along the vertical wall of the screed box 33 and which is held thereon and spaced horizontal shoe members 122 riding on the flanges or partitions of the pans passing the screed box which are described below. The vertical members 121 are slidably held in a manner not shown on the screed box front wall.

The screeding shoe 35 is provided in order to screed off the mixture filled into the conveyor pans. The screeding shoes may be vibrated or some other well known tamping equipment may be used in order to secure a perfect screeding action. The screeding shoes are always resting on the pans to be filled and therefore bridge the gap between the pans and the box which has to be left for obvious reasons.

As already mentioned the conveyor boom 11 carrying the conveyor 10 is arranged below the screed box 33. The conveyor boom consists of a hollow supporting body 38 extending laterally across the space between the two sections 29 of barge 14 while its longitudinal cross section is elongated and extends somewhat beyond the sections 29 at the end of the barge. The hollow body 38 as seen from Figure 3 may be made of a number of plates and girders joined and riveted so as to form a unitary structure and it comprises an enlarged open head 123 at the top and a foot portion 124 consisting of a number of floating compartments 125.

The boom is suspended on and swingable around a cylindrical hollow trunnion 126 which is mounted in the barge 14 between the two sections 29. The boom is swingably held for a rocking movement around said trunnion by means of bearings (108, Fig. 14) which are mounted on the outside on both sides of the boom. The head 123 of the boom has an arcuate portion 123a and is open so that it may swing around the relatively stationary structure in its interior.

Along the boom 11 the conveyor 10 is arranged which consists essentially of a number of parallel endless chains 60 supporting pans 63, described in detail below, between them. As seen from Figure 2, the transverse distance between the chains is limited by the size of the pans which is determined by the size of the blocks so that a substantial number of chains and of pans supported by them are required in order to cover the entire width occupied by the boom.

The chains are trained over sprocket wheels 41, 42. The sprocket wheels 41 are mounted on a shaft 39 which acts as a drive shaft and which is therefore driven by an electric motor (not shown). This shaft is journalled fixedly on the barge and is supported by bearings 139 carried by members 127 by means of supporting ribs or webs 140. The members 127 are fixed to the trunnion 126 by welding or in any other suitable manner. This construction is however merely an example as the shaft 139 is a stationary shaft which may be supported on members carried by the barge in any other suitable manner.

On the lower end of the boom 11 another series of sprocket wheels 42 is arranged which are carried by a transverse shaft 40 supported by and held on the boom 11.

The second series of sprocket wheels is driven by the chains.

Additional or intermediate sprocket wheels 140 are arranged on the outer side of the loop formed by the endless chain at the point at which the uppermost sections of the chains change their direction and are joined to a section of the chain which is substantially parallel to the axis of the boom. These sprocket wheels are all mounted on a traverse shaft 141.

The upper sections of the chains are moreover guided by means of guide rails 78 and 74 supported by ribs 147 and 148 which project from the members 127 attached to or solidary with trunnions 126. The guide rail 78 is provided with a straight and with an arcuate portion, the latter being concentric with the trunnion 126 and serving to guide the upper stretch of the chains towards the intermediate sprocket wheels 140. The length of the arc which is active and guides the chain varies in accordance with the position of the boom with respect to the water level.

The straight portion of the guides 78—in conjunction with the further guiding means described below—serves to guide the chains along a substantially horizontal path located directly below the screed box 33.

A second guide rail 74 is provided on the opposite side of the trunnion 126 and is also of arcuate shape, the arc being concentric with the trunnion. This guide rail serves to produce a change of direction of the chain when the boom 11 is lifted. Guide rail 74 may be held by the members 127 attached to the trunnion 126 by means of webs or ribs 148.

As seen in Figures 3 and 4, said chains which are parallel to the axis of the boom almost for their entire length are spreading in the head portion 123 of the boom, the directions of travel of the chain sections in the head portion forming a triangle. It will also be noted that to the left of a vertical plane passing the axis of said trunnion in Figure 4 the angular direction of travel of the chain sections is fixed for all positions of the boom while the angular direction of travel of the chain sections in the other part of the boom varies with its position. The top section of the chain, as already mentioned, passes below the screed box and this section is substantially horizontal while all other sections may be inclined toward the horizontal at an angle corresponding to the lowermost position to which the boom may be lowered.

Further guide rails 75 are provided along the boom in order to guide the chain during its downward travel. The chains in order to ride along the guide rails without much friction may be provided with anti-friction rollers 149 at their joints.

On the conveyor chains 60 the pans 63 are pivotally supported. These pans which are shown separately in Figures 7 to 13 consist of elongated double walled containers of oblong shape. They are subdivided into buckets or compartments 64 with slightly tapering inner walls 67 forming molds for the asphalt tiles or blocks. The partitions 65 between the buckets or compartments are perforated as shown at 66 in Figure 12. Between the outer walls 67 of the pan and its inner walls a water jacket 106 is formed surrounding the buckets or molds on all sides.

The pans are provided with pivot axles 70 which are positioned slightly off center with respect to the plane of symmetry with which they are pivotally mounted on the chains 60. The pans have therefore a tendency to tilt slightly around said pivots in a loaded as well as in an empty condition on account of the slight eccentricity of the pivot on the pan. Near their forward ends in the direction of motion the outer walls 68 are provided with openings 69 from which water may enter during the movement of the pans along the chains. These openings are shown in Figure 13 and they may be provided with a projecting tubular sleeve 56 carrying a screen mesh 58 to keep out floating objects.

The upper end of the outer wall 68 of the pan 63 may be provided with a flange 71. The flange 71 on the front end of the pan may be slightly depressed so that, when two adjacent pans are aligned, the rear flange 71a of one pan may cover the flange at the front end without tilting the pan so that perfect alignment in a straight line is possible where the flanges are overlapping. Therefore, hot material dropping from the feed box which was screeded off by the screed blade will not penetrate into the space below the pans and will be pushed into the next pan during the passage below the screed blade. However, a trough 92 may be provided below the pans which is equipped with a transverse belt conveyor 92a collecting the material falling through the gaps and conveying it outside.

The compartments 64 of the pans may communicate with the outside by means of sleeves 93 with bores passing through the water jackets 106. These bores prevent the formation of a vacuum which may tend to interfere with the removal of the blocks from the pan.

The pans are preferably provided with wear strips 129 with which they slide on guide rails, described below, and which may be renewed when worn out so as to protect the material of the container against being worn out by friction.

As will be clear the pans 63 have to be held in predetermined positions while they travel from one end of the boom to the other and back to the upper end. The upper or head portion of the boom is the charging end in which the pans have to be guided to to adopt a predetermined position in order to fill their water jackets with water and to keep them filled and further in order to align the pans in a substantially horizontal straight line below the delivery slot of the screed box 33. Therefore in addition to the chain guides 74 and 78 pan guiding rails 76 are provided which are so positioned that the bottoms of the pans slide along said guide rails while their pivots 70 carried by the chains 60 are guided by the latter.

The guide rail 76 therefore has two straight sections 76a and 76b joined by an arcuate section, the first named section being arranged below the screed box and providing guidance for a number of aligned pans during the filling operation while the section 76b is arranged at an angle with respect to the first named section 76a and keeps the pan in such a position that the openings 69 which permits the water to enter are upwardly directed. These guide rails also bring the pans into such a position that their alignment on the stretch 76a is facilitated.

The chain guide 78 and the pan guide 76 are made divergent to a slight extent behind the screed box so that the overlapping pans are separated suddenly to counteract a tendency to stick together.

A further pan guiding rail 128 is arranged along the underside of the boom 11 to keep the pans aligned while they are moved by the lower and ascending section of the chain. A guiding plate or wall 128a facing the guiding rail 128 may be arranged on which the flanges or upper portions of the pans may slide so that the pans are moved in the lower part of the boom through a channel formed in the boom body 38 which prevents sagging of the chain and a consequent relative movement of the pans. Above the pans and in front of the feeding box 33 an oil spraying tube 72 is arranged which provides the pans passing beneath it with a thin oil film, facilitating the detaching of the hot asphalt blocks formed in the molds of the pans. The screed shoe 35 rests on the lateral flanges of the pan and in this position the edge of the front plate 121a of the screed box screeds off the material which has been emptied into the pans in such a manner that every pan is filled up to the flange so that an even and smooth upper surface is formed.

A number of water spraying tubes 73 are arranged behind the screed box 33 to spray water on the upper surface of the asphalt filled pans to accelerate the hardening of the mixture at this point.

On the stretch between the guide rails 78 and the sprocket wheel 140 and between the said sprocket wheel and the sprocket wheel 40 at the bottom the pans occupy a position on the chain which is only slightly inclined with respect to the horizontal. The pans are therefore always in such a position that no marked tendency of the still somewhat fluid, viscous hot mixture to flow out of the pan manifests itself. The spraying of water on the surface hardening the crust forming at the surface will contribute to build up resistance against the pouring out of the mixture at the forward end. After a short while the water of the water jackets and also the water spray covering the surface of the asphalt blocks has hardened the entire outer surface of block to an efficient extent.

At the lower end of the boom 11 the pans 63 have to be tilted suddenly in order to dump the asphalt blocks onto the embankment or onto the mattress already formed by previously dumped blocks. In order to tilt the pans in the desired way a pan guiding rail 143 (Figure 5) is provided which is curved in a suitable manner. As seen in the figure the block filled pans which are carried by a guided chain but are not guided themselves are in a slightly inclined position towards the horizontal plane passing through the pivots when they arrive at the lower end of the boom. At this end the bottom of the pan which is slightly tilted is brought into contact with the straight section of the guide rail 143 which is substantially parallel to the chain running at this point over the sprocket wheel 42. By virtue of the curvature of the guide rail 143 and of the relative position of the same with respect to the chains 60 which are running around the lower sprocket wheel 42 at this point and therefore change the direction of movement, the pan by moving around with the chain over the sprocket wheel is tilted outwardly by the curved section of the guiding rail 143 and therefore ejects the asphalt blocks which it contains. The adjacent curved section of the guiding rail then guides the pan again into a position in substantial parallelism with the chain while the latter, after having passed the sprocket wheel, moves again upwardly.

A further curved pan guiding surface 130 may be formed in the boom in front of the sprocket wheel facing the same and the chains which provide a more positive movement of the pans by guiding the outer flange of the pans simultaneously while the bottom is sliding on the inner guiding rail 143.

At the end of the conveyor boom 11 float and ballast tanks 125 are provided which may be manipulated by means of an air compressor and by conduits and pipes (not shown) in order to furnish the required load or the required buoyancy by filling or emptying the tanks, in order to keep the boom on or near the bottom of the river bed or in order to raise it to the desired extent. The lower edges and the lateral edges of the body 38 of the boom are preferably well rounded and they may be provided with a bullnose. Preferably they are streamlined in order to offer as little resistance as possible to the water flowing around it.

The barge 14 is provided with a hoisting device 55 consisting of cables or chains 53 running over rollers 51 fixed on a sheave 52 which is connected to the boom by chains 54. The chains 54 are lifted by the sheave 52, when the cables 53 are reeled by the winches 55. They are manipulated by operating the winch in order to lift the boom above water level. Lifting of the boom above water level is required during the transport of the barge 14 and at the start of the operation and when starting a new strip, this lifted position being indicated in Figure 1.

The boom may be completely covered with sheet iron plates which are suitably shaped and streamlined around their edges. In this cover an ejector opening 57 is provided near the lower end through which the blocks are ejected from the conveyor 10. Means to attach a detachable floatability cover 58 to the said opening are provided in order to keep the boom floating, if necessary.

The operation of the revetment plant is the following.

The laying of the revetment starts, as a rule, above the water line. For a starting operation the boom 11 is first lowered into the water by means of the winches 55, cables 53 and chains 54, and by manipulating the buoyancy and ballast tanks 48. The preliminary lowering of the boom is however only necessary at the start of the operation and need not be repeated each time when the plant is shifted and the operation start above the water level.

The preliminary lowering of the boom at the start serves the purpose of filling the jackets of the pans with water and of producing a series of blocks which are cooled to the right point.

The preparation of the mixture proceeds in the customary asphalt plant and does not differ from the preparation of a mixture of bituminous matter for other purposes. The mixture, as already mentioned, consists of asphalt and sand or of asphalt, sand and gravel to which mixture a mineral filler or powdered loess may be added. Ordinary bar run sand dug from the sand bars of the river in the vicinity of which revetment may be used so the larger part of the materials are drawn from local sources.

The mixture after having been prepared in the customary manner is delivered to and filled into the bins 17 of the bin barge and may be kept there in a heated condition.

From the bins 17 the hot mixture is delivered to the hoppers 32 by means of the derricks 16. The mixture is distributed uniformly and evenly within the feeding box 33 by screw conveyors 34 and 34a and it then drops through the discharge end of the screed box 33 into the water cooled pans 63 when they pass under the screed box, the screed shoes 35 and plates 121 keeping the pans level full, but removing any surplus so that a smooth and even upper surface results. The pans which are moved continuously past the lower end of the screed box 33 have been sprayed with oil from oil pipe 72 before passing the screed box 33 and on account of the oil film and of the difference of temperature between the water cooled walls and the hot mixture the said mixture will not adhere while cooling in the pans. The exposed surface of the pan filled with the asphalt mixture which is not cooled directly by the jacket is sprayed with water ejected from tubes 73 which are placed behind the screed box and this surface is therefore cooled as soon as the pan emerges from the screed blades 121.

The pans are further conveyed towards the end of the boom, their position being first maintained by means of the guide plates or rails 76. While aligned their flanges overlap each other as above described. When leaving the guide rail they are suspended on the chain in a substantially horizontal position and, while in this position, they enter the water where they are further cooled to the desired extent. The length of the boom and the speed of the conveyor are so selected that the blocks are cooled to the desired degree when arriving at the lower end of the boom.

After the pans on the upper section of the conveyor have all been filled, so that a series of blocks has been formed while the boom was submerged and when all the jackets of the pans have been filled with water the operation may start from water level by lifting the boom and bringing it into a position which, as a rule, is higher than the position which is shown in Figure 1. The operation may then start in the air and continue for some time in this way using the blocks which have been cooled in water and the water which has been filled into the jackets of the pans. As a rule, this phase of the operation in which the boom is lifted above water level is however short. The boom will very soon be again submerged below water level. If work has to be carried out above water level for a protracted period this submerging and hoisting operation of the boom may be repeated.

During the regular operations the asphalt blocks harden at the surface so that a firm crust is formed surrounding a hot core when they arrive at the lower end of the conveyor where the pans are overturned and throw the asphalt blocks out of the pans into the river bed. The adhesive properties of the blocks have not disappeared as the said blocks are still heated from within. The blocks should arrange themselves in such a manner that they overlap and, on account of the fact that they are still warm, they stick together and firmly adhere to each other. This adhesion and a certain amount of plasticity does not disappear when cooling sets in, this being mainly due to the asphalt material which has been used. Therefore, a continuous mat or layer of firmly adhering blocks is formed merely by dropping the blocks in such position that they will adhere to each other.

It will be noted that the boom has to be lowered more or less continuously while the barge is moved outwardly away from the river bank or embankment in order to form a strip of the revetment. When the boom is lowered or lifted only one end of the chain conveyor moves with the boom the other being fixed within the head 123 to the barge with the head 123 moving around this fixed end. The adjustment of the chain conveyor to the position of the boom at this end is produced by a movement of the chains.

It will be clear that there are two means for regulating the laying of the revetment. One of these means is the regulation of the speed of the conveyor which is mainly used in order to adjust the temperature of the blocks discharged at the end of the boom. The second means consists in the regulation of the speed of the outward travel of the barge 14 along the mooring barges which is performed as a rule by regulating the speed of the motor driving the cable winches. The regulation of this speed controls the thickness of the layer which is deposited and it is therefore seen that the thickness of the layer in the same strip may vary in any desired way. The ease with which the variation of the thickness of the revetment is obtained helps greatly in producing a revetment of great durability.

When the barge 14 has arrived at the point at which the submerged end of the boom has reached the toe of the revetment, a strip has been completed. The conveyor is then stopped and the boom is lifted, the barge 14 travels inwardly toward the river bank or embankment and the mooring barges are moored in a new position in which the boom starts again to lay the revetment on the river bank above water level. However in this case no preliminary lowering of the boom is necessary, as a sufficient number of cooled blocks is available on the conveyor when the boom is lifted and all of the water jackets of the pans are filled at this time. Operations may therefore continue immediately after the maneuvering of the barge is completed. It is advisable to make consecutive strips overlap to a certain extent to obtain perfect continuity of the revetment. In the foregoing an operation was described as starting at the bank and laying the strip outward into the river. However operations are most frequently carried out starting from the toe of the revetment in the river and working towards the bank. It seems however unnecessary to describe this operation in detail as the way of handling the apparatus is essentially the same, the handling at the start being even simplified by this way of proceeding.

The revetment made of asphalt bonded blocks in the manner described has a much greater durability than known revetments and requires less maintenance. The asphalt bonded blocks under the influence of a raised temperature form a mattress of strongly adhering elements conforming their shape to that of the adjacent elements and to the river bank immediately after the laying operation takes place. The plasticity of the elements is maintained for some time and does not disappear when the temperature has gone down and has reached the water temperature, this being due to the nature of the bituminous material. The adaptation of the shape of the mattress and of its elements to the change of the river bank and to the internal changes continues even after cooling.

The revetment plant as above described is useful for repairing and restoring existing revetments. Existing revetments may be covered with a further flexible continuous mattress which gives the desired protection either directly or by reinforcing and covering the existing revetment or what is left of it. The equipment may therefore be used for repair without any specific adaptation to the revetment originally laid.

It will be clear from the foregoing that the invention resides in the features as above described and as claimed in the annexed claims and that it is not connected with specific constructive details of minor importance which are unessential for the carrying into effect the principle which has been described above.

Having described the invention, what is claimed as new is:

1. A revetment laying plant for making a protective cohesive covering consisting of separate independent block elements, adapting itself to the sinuosities of a river bank or bed, comprising a floating barge, a boom pivotally mounted near one of its ends on said barge, the pivoted end of the boom being held by the barge above water level, means for lowering and raising the free end of the boom, and means for holding it at any selected angular position, means for molding a number of completely separate, independent block units, said means including pans provided with trunnions, freely suspended on said trunnions, said pans being completely closed on the sides and on the bottom, and each pan containing a number of separate aligned block molds, said pans being arranged transversely with respect to and aligned along the boom in closely adjacent positions, endless carrying means for the freely suspended pans, means for continuously advancing the said endless carrying means of the pans along the upper side of the boom from the pivoted end above water level to the free end and along the downwardly facing side of the boom, back to the pivoted end of the boom above water level, means arranged near the said endless carrying means and near the pivoted end of the boom for filling the molds in the pans with a hot asphalt containing mixture, and means for ejecting separately and continuously the separate block elements formed in the block molds within the pans at the free end of the boom in a predetermined direction, thus depositing them continuously by the advance of the pans along the boom at predetermined spots in the river bed or on the river bank.

2. A revetment laying plant for making a protective covering consisting of separate single block elements, said covering adapting itself to the sinuosities of a river bank and bed, comprising a floating barge, a boom pivotally mounted near one end of the same with its pivoted end above water level, means for molding a number of unconnected, completely separate and independent block units, said means including a plurality of transversely aligned separate block molds each arranged within a molding pan, said molding pans being mounted transversely with respect to the boom and closely adjacent each other, and forming a continuous endless series along the upper, lower and end surfaces of the boom, endless means for freely suspending and carrying said pans, means for moving said last named means continuously along the upper and lower surfaces of the boom and around its ends, means on said barge for filling the block molds of each pan with a hot asphalt containing mixture while moved over the pivoted end of the boom by the means suspending and carrying the pans, ejection means near the free end of the boom for ejecting the block elements independently formed in the block molds during the travel of the pans from the pivoted end of the boom to the free end of the same, and directional means producing an ejection of the independent blocks in a predetermined direction, and depositing them at predetermined spots below the free end of the boom in the river bed or on the river bank.

3. A revetment laying plant for making a protective cohesive covering, consisting of separate independent block elements, adapting itself to the sinuosities of the river bank and bed, comprising a floating barge, a boom pivotally mounted near one end on the same, the pivoted end being above water level, means for molding a number of completely separate, independent asphalt block units, including pans completely closed on the sides and the bottom and suspended on trunnions, each pan containing a number of block molds aligned in a transverse row, said pans being aligned transversely along the outer surfaces of the boom in a closely adjacent position, endless conveying means carrying said pans while freely suspended, said freely suspended pans forming an uninterrupted series along the said boom, means for moving said endless conveying means continuously from the pivoted end towards the free end of the boom and back towards the pivoted end, means arranged on the barge above the boom for filling a hot viscous asphalt containing mixture into each of said separate block molds while the latter are moved over the pivotally mounted end of the boom, and means for ejecting said block elements from said block molds in a definite direction when the pans carried by the continuously moving endless conveying means reach a predetermined point on the boom near the free end of the same.

4. A revetment laying plant for making a protective cohesive covering, consisting of separate independent and unconnected block elements, adapting itself to the sinuosities of a river bank and bed, comprising a floating barge, a boom pivotally mounted near one end on said barge, the other end of the boom being freely movable, means for raising and lowering the free end of the boom and for holding it in a preselected angular position, an endless conveyor on said boom, means on said conveyor for molding a number of completely separate and independent unconnected block units, including pans freely suspended on said conveyor, said pans being completely closed on all sides and on the bottom, but open at the top, each pan containing a number of separate block molds producing separate unconnected block elements when filled with a hot fluid viscous asphalt containing mixture, a screed box mounted on the barge transversely with respect to the boom and having a discharge opening located above and in substantial parallelism with the pans, said screed box filling through its discharge opening the block molds during their passage with asphalt containing mixture, means for distributing the asphalt containing mixture within the screed box evenly, suspension means for the pans for holding the same freely suspended in a substantially horizontal position during their movement from the pivoted end of said boom to the free end of said boom, means for ejecting the independently formed block elements from the block molds in the pan when the pans reach a definite point near the free end of the boom, said ejecting means including means for producing a sudden complete tilting of the pans at the free end of the boom, and directional means for directing the independent blocks ejected from the mold in a predetermined direction, thus depositing them at regularly predetermined spots relatively to the free end of the boom in the river bed or on the river bank.

5. A revetment laying plant for making a cohesive protective covering consisting of separate, independent and unconnected block elements covering the bank or bed of a river, which covering adapts itself to the sinuosities of said river bank or bed on which it is laid, comprising a floating barge, a boom pivotally mounted near its end on said barge with the pivoted end of the boom above water level, a series of independent block molds held within pans, transversely arranged with respect to said boom, said pans forming an uninterrupted series along the upper and under surfaces of the boom, means for freely suspending and carrying said pans, said suspending means including trunnions holding the pans independently of each other substantially in a balanced position determined by gravity, on the upper surface of the boom, means for continuously moving said suspending and carrying means of said pans from the pivoted end of the boom towards the free end and then back to the pivoted end, a screed box filled with a hot fluid viscous asphalt containing mixture, said screed box consisting of an elongated container with an elongated opening arranged transversely with respect to the boom and in substantial parallelism to the pans, adjacent to the molds which are conveyed over the pivoted end of the boom, a feed box and a distributing screw conveyor within said screed box, distributing said hot viscous asphalt containing mixture evenly along the screed box, and ejection means on the free end of the boom ejecting the block elements formed in the molds during their passage from the pivoted end to the free end in a given direction, said means including directional means depositing the block elements at regularly predetermined spots near the free end of the boom in the river bank or in the river bed.

6. A revetment laying plant for making protective coverings as claimed in claim 5 provided with a screed shoe including a screed plate, movable on the screed box, said screed shoe resting on the pans and holding said screed plate against the upper edge of the pan during the passage of the latter over the pivoted end of the boom to screed off the overflowing material running into the molds from the screed box.

7. A revetment laying plant as claimed in claim 5 wherein an oil spraying nozzle is arranged in front of the screed box and a water spraying nozzle is arranged behind the screed box in order to lubricate the molding pans before their passage under the screed box and in order to cool the surface of the filled molding pans.

8. A revetment laying plant for making a cohesive protective covering consisting of separate, independent unconnected block elements for the bank and bed of a river, adapting itself to the sinuosities of the said river bank or bed on which it is laid, comprising a floating barge, a boom pivotally mounted near one of its ends on said barge, with the pivoted end above water level, a series of independent block molds arranged in rows within pans transversely arranged along the boom and forming an uninterrupted series along the same, means for freely suspending and carrying said pans, said means including trunnions on the pans, freely suspending the same, and endless chains provided with trunnion holders for holding said trunnions of the pans in a freely rotatable manner, means moving said pan carrying and suspending means continuously from the pivoted end of the boom to the free end and back to the pivoted end, driving sprocket wheels and idle sprocket wheels at the pivoted end and at the free end of the boom, respectively, for holding and guiding said chains, means for driving said driving sprocket wheels, guide rollers on the chains, a guiding rail on the barge near the pivotally mounted end of the boom on said barge, guiding a section of said chains along a straight horizontal line between the sprocket wheels at the pivoted end and at the free end of the boom in every angular position of the boom, a screed box mounted on the barge transversely with respect to the boom and having a discharge opening located above and adjacent to the pans, said screed box being arranged close to and above the section of the chains guided along a straight line, means for filling said screed box with a hot fluid viscous asphalt containing mixture, said screed box discharging said mixture into the block molds and filling them with the mixture when passing under the screed box, thus producing independent, unconnected hardened block elements within the said block molds during the movement of the block molds from the pivoted end of the boom to the free end of the boom, and ejection means on the free end of the boom for ejecting said separate block elements in a given direction.

9. A revetment laying plant as claimed in claim 8 comprising additionally a pan guiding rail on said barge for aligning the freely suspended pans so that their upper faces are substantially in the same plane, while conveyed along the chain section guided by the chain guided rail.

10. A revetment laying plant as claimed in claim 8 comprising additionally a pan guiding rail section on the barge below the pans for aligning the freely suspended pans so that their upper faces are substantially in the same horizontal plane while conveyed over the guided chain section, said pan guiding rail section being arranged near a section of the conveyor adjacent to and leading from the driving sprocket wheel at the pivoted end of the boom, further pan guiding rail sections arranged at an angle with respect to the aforesaid substantially horizontal rail section, guiding the pans so that they adopt successively inclined and vertical positions, said last named guiding rail sections leading towards the driven sprocket wheel at the pivoted end of the boom.

11. A revetment laying plant as claimed in claim 8 comprising in addition pan guiding rails arranged along the under surface of the boom, in substantial parallelism to the endless chains, said pan guiding rails keeping the freely suspended pans in alignment with the chain and with the downwardly facing surface of the boom, and a guiding plate facing the guiding rail and forming part of a channel within the boom through which the pans are moved towards the pivoted end of the boom.

12. A revetment laying plant as claimed in claim 8 comprising in addition a guide rail for the pans at the free end of the boom between and near the idle sprocket wheels at this end, said guide rails being curved around the center of the idle sprocket wheel and producing sudden tilting of the pans in order to eject the separate unconnected blocks formed in the pan, said boom being further provided at its free end with an ejection channel leading towards the undersurface of the boom at this end for the passage of the ejected hardened asphalt containing blocks in a predetermined direction relatively to the free end of the boom.

13. A pan for a revetment laying plant as claimed in claim 8 with substantially unbroken outer side walls and a bottom wall comprising a number of transverse separate compartments each provided with separate side walls and bottom wall, each compartment forming a block mold, said block mold being surrounded by the side walls and the bottom wall of the pan, the space between the side and bottom wall of the molds and the side walls and bottom wall of the pan forming a water jacket for cooling purposes.

14. A pan as claimed in claim 13, in which the outer wall of the pan enclosing the water jacket is provided with an opening in the side of the wall, leading during the movement of the pan and adapted to collect water during its travel along the boom.

15. A revetment laying plant as claimed in claim 8, wherein an additional guide for the molding pans is arranged in the ejection channel facing the guide rail arranged between and near the sprocket wheels, for guiding the upper portion of the molding pans during the tilting of the same.

References Cited in the file of this patent

UNITED STATES PATENTS

| Number | Name | Date |
|---|---|---|
| 961,222 | Fahrney | June 14, 1910 |
| 1,359,575 | Chenoweth | Nov. 23, 1920 |
| 1,453,747 | Carey | May 1, 1923 |
| 1,956,967 | Upson | May 1, 1934 |
| 2,051,578 | Schloss et al. | Aug. 18, 1936 |
| 2,332,688 | Baily | Oct. 26, 1943 |